United States Patent
Yu

(10) Patent No.: US 12,130,626 B2
(45) Date of Patent: Oct. 29, 2024

(54) LATERAL CONTROL IN PATH-TRACKING OF AUTONOMOUS VEHICLE

(71) Applicant: Jingsheng Yu, Novi, MI (US)

(72) Inventor: Jingsheng Yu, Novi, MI (US)

( * ) Notice: Subject to any disclaimer, the term of this patent is extended or adjusted under 35 U.S.C. 154(b) by 564 days.

(21) Appl. No.: 17/330,536

(22) Filed: May 26, 2021

(65) Prior Publication Data

US 2022/0206498 A1    Jun. 30, 2022

Related U.S. Application Data

(60) Provisional application No. 63/132,324, filed on Dec. 30, 2020.

(51) Int. Cl.
*G05D 1/00* (2024.01)
*B60W 60/00* (2020.01)

(52) U.S. Cl.
CPC ......... *G05D 1/0212* (2013.01); *B60W 60/001* (2020.02); *B60W 2510/18* (2013.01); *B60W 2520/06* (2013.01); *B60W 2520/14* (2013.01); *B60W 2520/20* (2013.01); *B60W 2520/30* (2013.01)

(58) Field of Classification Search
CPC .............. G05D 1/0212; B60W 60/001; B60W 2510/18; B60W 2520/06; B60W 2520/14; B60W 2520/20; B60W 2520/30; B60W 2050/0031; B60W 2540/18; B60W 30/10; B60W 50/0098
USPC .......................................................... 701/25
See application file for complete search history.

(56) References Cited

U.S. PATENT DOCUMENTS

| | | | | |
|---|---|---|---|---|
| 8,135,528 B2* | 3/2012 | Takenaka | ............... | B60W 10/12 701/72 |
| 2005/0222731 A1* | 10/2005 | Ghoneim | ............ | B60T 8/17555 180/408 |
| 2007/0027586 A1* | 2/2007 | Deng | ...................... | B60T 8/172 701/1 |
| 2007/0055431 A1* | 3/2007 | Deng | .................... | B60T 8/1755 701/80 |
| 2009/0024293 A1* | 1/2009 | Takenaka | ............... | B62D 6/002 701/71 |
| 2009/0082923 A1* | 3/2009 | Gerdes | .................. | B60W 10/20 701/41 |
| 2009/0171526 A1* | 7/2009 | Takenaka | ............ | B60W 40/101 701/70 |

(Continued)

*Primary Examiner* — Mohamed Abdo Algehaim
(74) *Attorney, Agent, or Firm* — David E. Novak; Brannon Sowers & Cracraft PC

(57) ABSTRACT

A system for lateral control in-path tracking of an autonomous vehicle includes a lateral controller. The lateral controller controls movement of the autonomous vehicle relative to a path and receives as an input a desired target. An outer control loop of the lateral controller includes a first controller generating an output based on the difference between the desired target and a current position of the autonomous vehicle. An inner control loop of the lateral controller includes a second controller receiving the generated output from the first controller. The inner control loop generates a sideslip angle and a yaw rate, wherein the sideslip angle and the yaw rate are returned to the second controller. The sideslip angle and the yaw rate are used to generate the relative yaw angle and lateral distance, which are returned to the first controller as the current position of the autonomous vehicle.

14 Claims, 3 Drawing Sheets

(56) References Cited

U.S. PATENT DOCUMENTS

| | | | | |
|---|---|---|---|---|
| 2010/0131142 A1* | 5/2010 | Deng | .................. | B60T 7/18 |
| | | | | 701/65 |
| 2011/0040464 A1* | 2/2011 | Ono | .................. | G01P 21/00 |
| | | | | 701/70 |
| 2011/0218706 A1* | 9/2011 | Mori | .................. | B60W 30/025 |
| | | | | 701/36 |
| 2018/0134267 A1* | 5/2018 | Mitsumoto | .................. | B60T 8/58 |
| 2019/0071126 A1* | 3/2019 | Giersiefer | .................. | B62D 15/025 |
| 2019/0317516 A1* | 10/2019 | Zhu | .................. | G01C 21/26 |
| 2020/0047752 A1* | 2/2020 | Ivanovic | .................. | B60W 30/12 |
| 2021/0240192 A1* | 8/2021 | Zhang | .................. | G05D 1/0891 |
| 2022/0080953 A1* | 3/2022 | Hwang | .................. | B60W 10/22 |
| 2022/0355862 A1* | 11/2022 | Kvieska | .................. | B62D 15/025 |
| 2023/0102778 A1* | 3/2023 | Kim | .................. | B60L 3/12 |
| | | | | 701/23 |
| 2023/0174040 A1* | 6/2023 | Kim | .................. | B60W 10/16 |
| | | | | 701/69 |
| 2023/0211786 A1* | 7/2023 | Peyret | .................. | B60W 40/10 |
| | | | | 701/36 |
| 2023/0264700 A1* | 8/2023 | Zhang | .................. | B60W 40/12 |
| | | | | 701/41 |
| 2024/0059275 A1* | 2/2024 | Gonzalez Bautista | .................. | |
| | | | | B60W 40/105 |
| 2024/0174239 A1* | 5/2024 | Narayanan | .................. | B60W 60/001 |

\* cited by examiner

LATERAL CONTROL IN PATH-TRACKING OF AUTONOMOUS VEHICLE

CROSS-REFERENCE TO RELATED APPLICATIONS

This patent application claims priority to U.S. Provisional Patent Application Ser. No. 63/132,324, filed on Dec. 30, 2020.

TECHNICAL FIELD

The present disclosure relates to the field of autonomous vehicles. More specifically, the present disclosure is related to a system and method for lateral control in path-tracking of autonomous vehicles.

BACKGROUND

A system and method for lateral control in path-tracking of an autonomous vehicle may include an algorithm for controlling the autonomous vehicle using, for example, a combination of front steering angle, rear steering angle and wheel torque of the vehicle. Inputs to the controller may include sensors and calculated signals providing information about the vehicle position relative to the path. Responsive to the information, the vehicle activates control actuators in an attempt to closely follow the path. The actuators can be different electronic units controlling, for example, front steering, rear steering, and driving or braking torque on the wheels.

The motion control system of autonomous vehicles usually controls both longitudinal and lateral dynamics simultaneously. The longitudinal controller is responsible for regulating the vehicle speed while the lateral controller steers the vehicle for path tracking.

The present disclosure is directed to one or more issues or features related to lateral control in autonomous vehicle path-tracking.

SUMMARY

A system for lateral control in-path tracking of an autonomous vehicle is provided. The system includes a control system including a lateral controller. The lateral controller is used to control movement of the autonomous vehicle relative to a path and receives as an input a desired target. An outer control loop of the lateral controller includes a first controller generating an output based on the difference between the desired target and a current position of the autonomous vehicle. An inner control loop of the lateral controller includes a second controller receiving the generated output from the first controller. The inner control loop generating a sideslip angle and a yaw rate, wherein the sideslip angle and the yaw rate are returned, via the inner control loop, to the second controller. The sideslip angle and the yaw rate are used to generate the relative yaw angle and lateral distance, which are returned to the first controller, via the outer control loop, as the current position of the autonomous vehicle.

A method for lateral control in-path tracking of an autonomous vehicle is also provided. The method includes controlling movement of the autonomous vehicle relative to a path using a lateral controller. According to the method, a desired target is input into the lateral controller, and a difference between the desired target and a current position of the autonomous vehicle is the input to the first controller of an outer control loop of the lateral controller. The generated output of the first controller received at a second controller of an inner control loop of the lateral controller. A sideslip angle and a yaw rate are generated using the inner control loop, wherein the sideslip angle and the yaw rate are returned to the second controller via the inner control loop. The method also includes a step of generating a relative yaw angle and a lateral distance using the sideslip angle and the yaw rate, wherein the relative yaw angle and the lateral distance are returned to the first controller, via the outer control loop, as the current position of the autonomous vehicle.

BRIEF DESCRIPTION OF THE DRAWINGS

Like reference numbers and designations in the various drawings indicate like element.

DETAILED DESCRIPTION

Before the present methods, implementations, and systems are disclosed and described, it is to be understood that this invention is not limited to specific synthetic methods, specific components, implementations, or to particular compositions, and as such may, of course, vary. It is also to be understood that the terminology used herein is for the purpose of describing particular implementations only and is not intended to be limiting.

The motion control system of an autonomous vehicle usually controls both longitudinal and lateral controllers simultaneously. The longitudinal controller is responsible for regulating the vehicle speed while the lateral controller steers the vehicle for path-tracking. The present disclosure is directed to the lateral control of an autonomous vehicle. The lateral controller discussed herein may also be employed in a human operated vehicle such as, for example, in a lane keeping system.

Figures 1, 2:
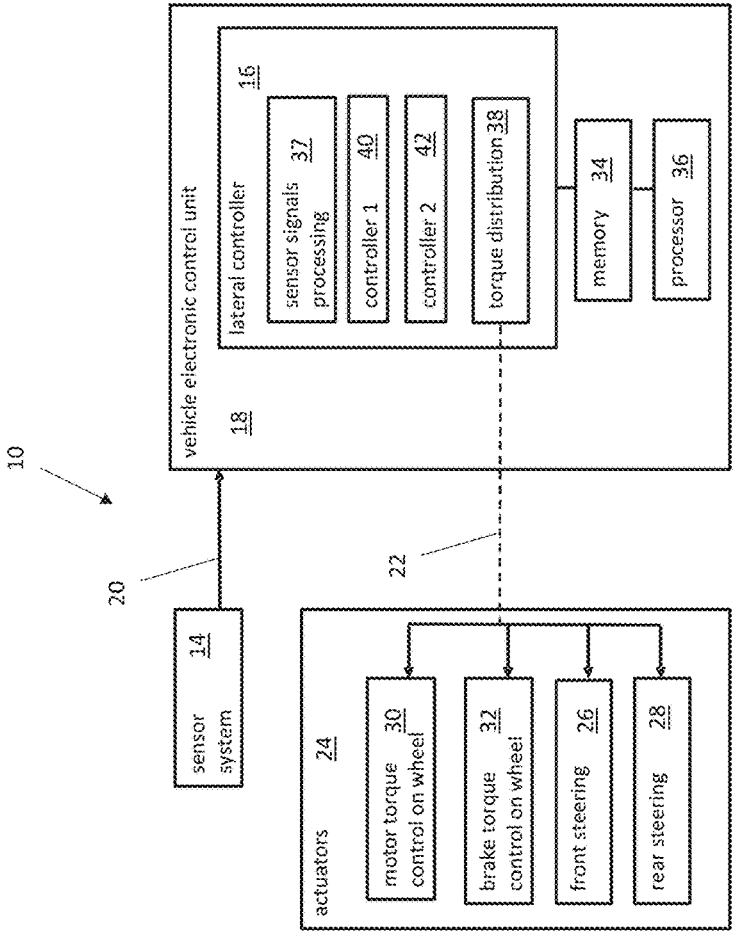
FIG. 1 is a block diagram of a control system, according to one aspect of the present disclosure.
FIG. 2 is a diagram depicting vehicle position and orientation relative to a driving path, according to another aspect of the present disclosure.

FIG. 1 shows a block diagram of a path-tracking lateral control system 10. The inputs to the lateral control system 10 include a sensor system 14 comprising a variety of different sensors/sensor signals. A lateral controller 16 is programmed in the central ECU (Electronic Control Unit) 18 of the path-tracking lateral control system 10. The ECU 18 receives sensor signals 20 from the path-tracking lateral control system 10, and the lateral controller 16 calculates the necessary output 22 to the actuators 24, which may control, for example, one or more of a front steer angle 26, rear steer angle 28 and wheel torque 30, 32.

The ECU 18 includes at least one memory 34 and at least one micro-processor 36, which processes signals, at 37, calculates and determines the vehicle status, and provides control signals 22 to the actuators 24. Depending on the output defined from the lateral controller 16 and the torque distribution 38, the corresponding actuator(s) 24 is/are to control the front steering angle 26, rear steering angle 28 and/or driving/braking torque on each wheel 30, 32. The present disclosure describes strategies for the lateral controller 16, which may utilize first and second controllers 40, 42, that improve lateral in-path tracking.

With reference to a diagram 60 of FIG. 2, the sensor system 14, referenced in FIG. 1, may measure a position of an autonomous vehicle 62 relative to a path 64 using the following signals:

$\psi_L$ relative yaw angle, yaw angle between the vehicle centerline 66 and the tangent to the path 64, $y_L$ lateral distance between the sensor lookahead position and the tangent to the path 64, In addition, the sensor system 14 may also provide signals of vehicle yaw rate, sideslip angle, vehicle speed and steering angles. A vehicle model, on which the lateral controller 16 may be based, may also use the following notations:

v vehicle velocity
$v_y$ vehicle lateral velocity
β vehicle sideslip angle
$\dot{\psi}$ vehicle yaw rate
$a_y$ vehicle lateral acceleration
$\delta_f$ front steering angle
$\delta_r$ rear steering angle
$l_s$ distance between sensor lookahead position and vehicle CG
$R_T$ turn radius of the vehicle The signals can be measured by the sensors or calculated based on estimation methods. The signals are processed using one or more algorithms of FIG. 1. If some signals are not measurable, estimation methods can be used. For example, the sideslip angle can be estimated based on other signals, such as yaw rate and steering angle.

Cascade control, which is described herein, includes a control algorithm/strategy in which the output of one control loop provides the target for another loop. The ultimate goal of the cascaded loops is to control the end process.

Figure 3:
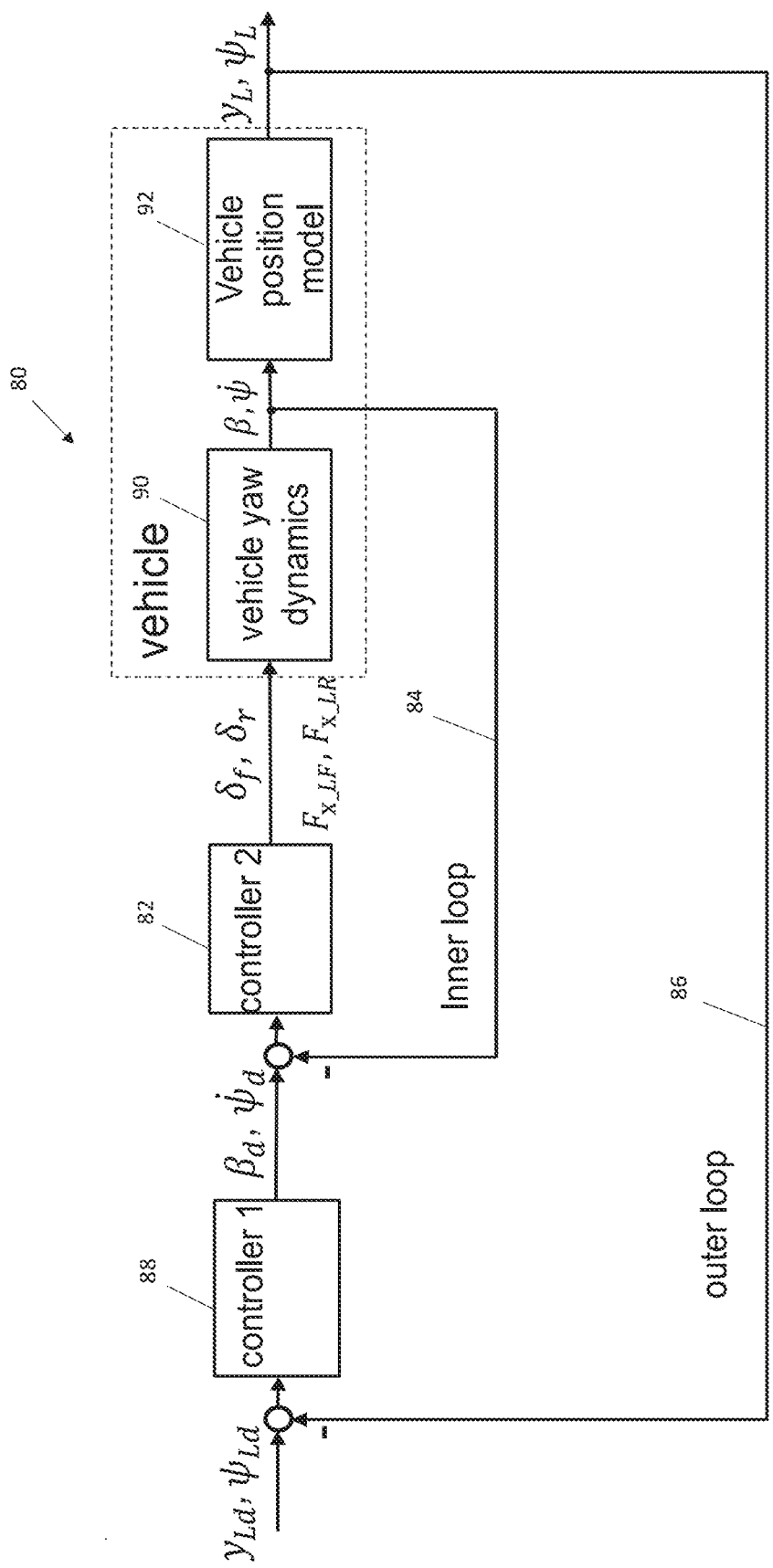
FIG. 3 illustrates a control strategy for the lateral controller, according to another aspect of the present disclosure.

Turning to a diagram 80 of FIG. 3, a first controller 88 generates a control effort that serves as a target for the second controller 82.

That controller 82 in turn uses steering actuators and wheel torques, such as at least one of actuators 26, 28, 30 and 32 of FIG. 1, to apply its control efforts directly to the inner loop dynamics. The inner control loop 84 then generates the outputs that serve as the control inputs for the outer control loop 86. The steering or wheel torque that the second controller 82 uses to maintain the sideslip angle and the yaw rate serve as the actuators, such as actuators 24 of FIG. 1, which act directly on the inner control loop 84 and indirectly on the outer control loop 86, which includes a first controller 88.

The purpose of the control is to keep the autonomous vehicle 62 following the path 64. The relative position of the autonomous vehicle 62 relative to the path 64 may be determined by the relative yaw angle and lateral distance, according to the exemplary embodiment. The goal is then to control the vehicle position to reach the target.

The first and second controllers 88, 82 are implemented in a cascade control structure, as shown in FIG. 3. The geometry of this cascade structure defines an inner control loop 84 involving the state (β,$\dot{\psi}$) and an outer control loop 86 involving the state ($\psi_L$,$y_L$).

The first controller 88 generates a control effort that serves as the target for the second controller 82. The first controller 88 receives a desired target and generates output, which represents the difference between the desired target and actual target. The output of the first controller 88 is a function of the actual and desired target of relative yaw rate, actual and desired target of the lateral distance, the steady state sideslip angle, and the steady state yaw rate.

An equation for the first controller 88, according to the present disclosure is defined as a state feedback and a compensation term $u_0$:

$$\begin{bmatrix} \beta_d \\ \dot{\psi}_d \end{bmatrix} = -\begin{bmatrix} k_{out1} & k_{out2} \\ k_{out3} & k_{out4} \end{bmatrix}\begin{bmatrix} \psi_L \\ y_L \end{bmatrix} + u_0$$

with $$u_0(t) = \begin{bmatrix} \beta_{st} + \psi_{Ld}k_{out1} \\ \psi_{Ld}k_{out3} + \dot{\psi}_{st} \end{bmatrix}$$

where $u_0$ is a vector, which is the compensation term and is to be specified so that it can compensate the nonlinear effects and the outer-loop becomes linear and ($\psi_{Ld}$,$y_{Ld}$) can be achieved. To meet this purpose, $u_0$ is specified as a function of the steady sideslip angle $\beta_{st}$, steady yaw rate $\dot{\psi}_{st}$ and parameters $k_{out1}$, $k_{out2}$, $k_{out3}$, $k_{out4}$. The parameters $k_{out1}$, $k_{out2}$, $k_{out3}$, $k_{out4}$ are controller parameters which can be selected by the user or determined using different methods such as pole placement or linear quadratic optimization.

Based on the above-referenced equation, the output of the first controller 88, which is the desired target for the second controller 82, is a function of the actual and desired target of the relative yaw rate $\psi_L$, the actual and desired target of the lateral distance $y_L$, the steady-state sideslip angle $\beta_{st}$ and steady-state yaw rate $\dot{\psi}_{st}$.

In order to determine the parameters in the first controller 88, a vehicle model, referenced as "vehicle position model," for the outer-loop dynamics can be used, such as:

$$\begin{bmatrix} \dot{\psi}_L \\ \dot{y}_L \end{bmatrix} = \begin{bmatrix} 0 & 0 \\ v & 0 \end{bmatrix}\begin{bmatrix} \psi_L \\ y_L \end{bmatrix} + \begin{bmatrix} 0 & 1 \\ v & l_s \end{bmatrix}\begin{bmatrix} \beta \\ \dot{\psi} \end{bmatrix} + \begin{bmatrix} -v \\ 0 \end{bmatrix}\frac{1}{R_T}.$$

In this equation, the sideslip angle and yaw rate are considered as the control inputs, which can be denoted by $u=[\beta\ \dot{\psi}]^T$. ($\psi_L\ y_L$)$^T$ is the output of the model, as shown below. Note that the model can use the vehicle lateral velocity $v_y$ instead of sideslip angle β because both variables are directly related.

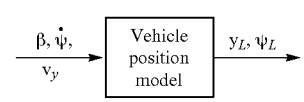

For further calculation, the following vector and matrices are defined:

$$x = (\psi_L\ y_L)^T,$$

$$A = \begin{bmatrix} 0 & 0 \\ v & 0 \end{bmatrix}, B = \begin{bmatrix} 0 & 1 \\ v & l_s \end{bmatrix}, K = \begin{bmatrix} k_{out1} & k_{out2} \\ k_{out3} & k_{out4} \end{bmatrix}.$$

In case of using the linear quadratic control method, a performance index is used:

$$J = \int_0^\infty \{(x - x(\infty))^T Q(x - x(\infty)) + (u - u(\infty))^T R(u - u(\infty))\} dt$$

The parameters $k_{out1}$, $k_{out2}$, $k_{out3}$, $k_{out4}$ are calculated based on the performance index $$K = R^{-1} B^T P$$

and the matrix P is determined through a Riccati equation $$A^T P + PA - PBR^{-1} B^T P + Q = 0$$

The weighting matrix Q and R can be selected by the user. As an example, the desired target of the relative yaw rate and the lateral distance can be chosen:

$$\begin{bmatrix} \psi_{Ld} \\ y_{Ld} \end{bmatrix} = \begin{bmatrix} -\beta_{st} - \dfrac{l_s}{R_t} \\ 0 \end{bmatrix}$$

The second controller 82 in turn uses the steering actuators, such as those referenced in FIG. 1, to apply its control efforts directly to the inner loop dynamics, represented at 90. The inner control loop 84 then generates the outputs that serve as the control inputs for the outer control loop 86. The steering or wheel torque that the inner loop controller 84 uses to maintain the sideslip angle and the yaw rate serve as the actuators 24 which act directly on the inner control loop 84 and indirectly on the outer control loop 86.

The second controller 82 is designed based on an exemplary model referenced as "vehicle yaw dynamics:"

$$\begin{bmatrix} \dot{\beta} \\ \ddot{\psi} \end{bmatrix} = \begin{bmatrix} -\dfrac{C_{\alpha f} + C_{\alpha r}}{Mv} & -1 - \dfrac{C_{\alpha f} l_f - C_{\alpha r} l_r}{Mv^2} \\ -\dfrac{C_{\alpha f} l_f - C_{\alpha r} l_r}{I_z} & -\dfrac{C_{\alpha f} l_f^2 + C_{\alpha r} l_r^2}{I_z v} \end{bmatrix} \begin{bmatrix} \beta \\ \dot{\psi} \end{bmatrix} + Bu$$

with
$l_f$ distance from CG to the front axle
$l_r$ distance from CG to the rear axle
$C_{\alpha f}$ front tire stiffness
$C_{\alpha r}$ rear tire stiffness
M vehicle total mass
$I_z$ moment of inertia of the vehicle about the z-axis at CG
where B is the input matrix and u the control input vector. Note that the model can use the vehicle lateral velocity $v_y$ instead of sideslip angle $\beta$ because both variables are directly related.

Depending on what actuator is used, B as well as u are differently formulated. Here, three sets of the actuators are considered in the design: front and rear steering, front steering and rear torque vectoring, front steering only. To simplify the description, a general form of the controller is presented first, and thereafter the controller is specified for each set of the actuators. Further, the following vectors and matrix are defined:

$$x(t) = [\beta \ \dot{\psi}]^T, \ x_d(t) = [\beta_d \ \dot{\psi}_d]^T$$

And $$A = \begin{bmatrix} -\dfrac{C_{\alpha f} + C_{\alpha r}}{Mv} & -1 - \dfrac{C_{\alpha f} l_f - C_{\alpha r} l_r}{Mv^2} \\ -\dfrac{C_{\alpha f} l_f - C_{\alpha r} l_r}{I_z} & -\dfrac{C_{\alpha f} l_f^2 + C_{\alpha r} l_r^2}{I_z v} \end{bmatrix}.$$

The general form of the controller is defined as:

$$u = \begin{bmatrix} -k_{in1} & -k_{in2} \\ -k_{in3} & -k_{in4} \end{bmatrix} \begin{bmatrix} \beta - \beta_d \\ \dot{\psi} - \dot{\psi}_d \end{bmatrix} + u_0$$

with $$u_0(t) = B^{-1} \left( \begin{bmatrix} \dot{\beta}_d \\ \ddot{\psi}_d \end{bmatrix} - A \begin{bmatrix} \beta_d \\ \dot{\psi}_d \end{bmatrix} \right)$$

where $u_0$ is a vector, which is the compensation term and is to be specified so that it can compensate the nonlinear effects and the inner-loop becomes linear to achieve the desired target ($\beta_d$, $\dot{\psi}_d$). To meet this purpose, $u_0$ is specified as a function of $x_d$, A, B and parameters in K. The parameters $k_{in1}$, $k_{in2}$, $k_{in3}$, $k_{in4}$ are controller parameters which can be selected by the user or determined using different methods such as pole placement or linear quadratic control method.

For front and rear steering, the control input u has front and rear steer angles as the components, e.g.:

$$B = \begin{bmatrix} \dfrac{C_{\alpha f}}{Mv} & 0 \\ \dfrac{C_{\alpha f} l_f}{I_z} & \dfrac{d_t}{I_z r_w} \end{bmatrix},$$

$$u = \begin{bmatrix} \delta_f \\ \delta_r \end{bmatrix}$$

so that the control law is $$u = \begin{bmatrix} \delta_f \\ \delta_r \end{bmatrix} = \begin{bmatrix} -k_{in1} & -k_{in2} \\ -k_{in3} & -k_{in4} \end{bmatrix} \begin{bmatrix} \beta - \beta_d \\ \dot{\psi} - \dot{\psi}_d \end{bmatrix} + B^{-1} \left( \begin{bmatrix} \dot{\beta}_d \\ \ddot{\psi}_d \end{bmatrix} - A \begin{bmatrix} \beta_d \\ \dot{\psi}_d \end{bmatrix} \right)$$

For front steering and wheel torque vectoring, the control input u has front steer angle $\delta_f$ and differential torque $\Delta T$ as the components, e.g., $$B = \begin{bmatrix} \dfrac{C_{\alpha f}}{Mv} & \dfrac{C_{\alpha r}}{Mv} \\ \dfrac{C_{\alpha f} l_f}{I_z} & -\dfrac{C_{\alpha r} l_r}{I_z} \end{bmatrix},$$

$$u = \begin{bmatrix} \delta_f \\ \Delta T \end{bmatrix}$$

where the differential torque between right rear and left wheels on front or rear axle is indicated by $\Delta T$, that is:

$$\Delta T = (F_{x\_R} - F_{x\_L}) r_w$$

$F_{x\_R}$, $F_{x\_L}$ are the braking force between right rear and left rear wheels or between right front and left front wheels, respectively. The control law is:

$$u = \begin{bmatrix} \delta_f \\ \Delta T \end{bmatrix} = \begin{bmatrix} -k_{in1} & -k_{in2} \\ -k_{in3} & -k_{in4} \end{bmatrix} \begin{bmatrix} \beta - \beta_d \\ \dot{\psi} - \dot{\psi}_d \end{bmatrix} + B^{-1} \left( \begin{bmatrix} \dot{\beta}_d \\ \ddot{\psi}_d \end{bmatrix} - A \begin{bmatrix} \beta_d \\ \dot{\psi}_d \end{bmatrix} \right)$$

$\Delta T$ is the differential torque between right and left wheels on the front or rear axle. It can be driving torque during acceleration or braking torque during deceleration. The torque vectoring of the differential torque $\Delta T$ is to be realized accordingly. For the driving torque vectoring the amount of the torque distributed on the axle is available from the engine control system while the braking torque vectoring uses the measurement through the braking system. Once the differential torque is determined, the individual wheel torque can be calculated.

In the case of front steering only, the control input u has only the front steer angle $\delta_f$, e.g., $$B = \begin{bmatrix} \dfrac{C_{af}}{Mv} \\ \dfrac{C_{af} l_f}{I_z} \end{bmatrix},$$

$$u = \delta_f$$

The method of Dynamic Programming or Model predictive Control can be applied by using the model:

$$\begin{bmatrix} \dot{\beta} \\ \ddot{\psi} \end{bmatrix} = \begin{bmatrix} -\dfrac{C_{af} + C_{ar}}{Mv} & -1 - \dfrac{C_{af} l_f - C_{ar} l_r}{Mv^2} \\ -\dfrac{C_{af} l_f - C_{ar} l_r}{I_z} & -\dfrac{C_{af} l_f^2 + C_{ar} l_r^2}{I_z v} \end{bmatrix} \begin{bmatrix} \beta \\ \dot{\psi} \end{bmatrix} + Bu$$

Using performance index:

$$J = \sum_{n=1}^{N} \{(x(k+n) - x_d(k+n))^T Q (x(k+n) - x_d(k+n)) + u(k+n-1) R u(k+n-1)\} dt$$

Figure 4:
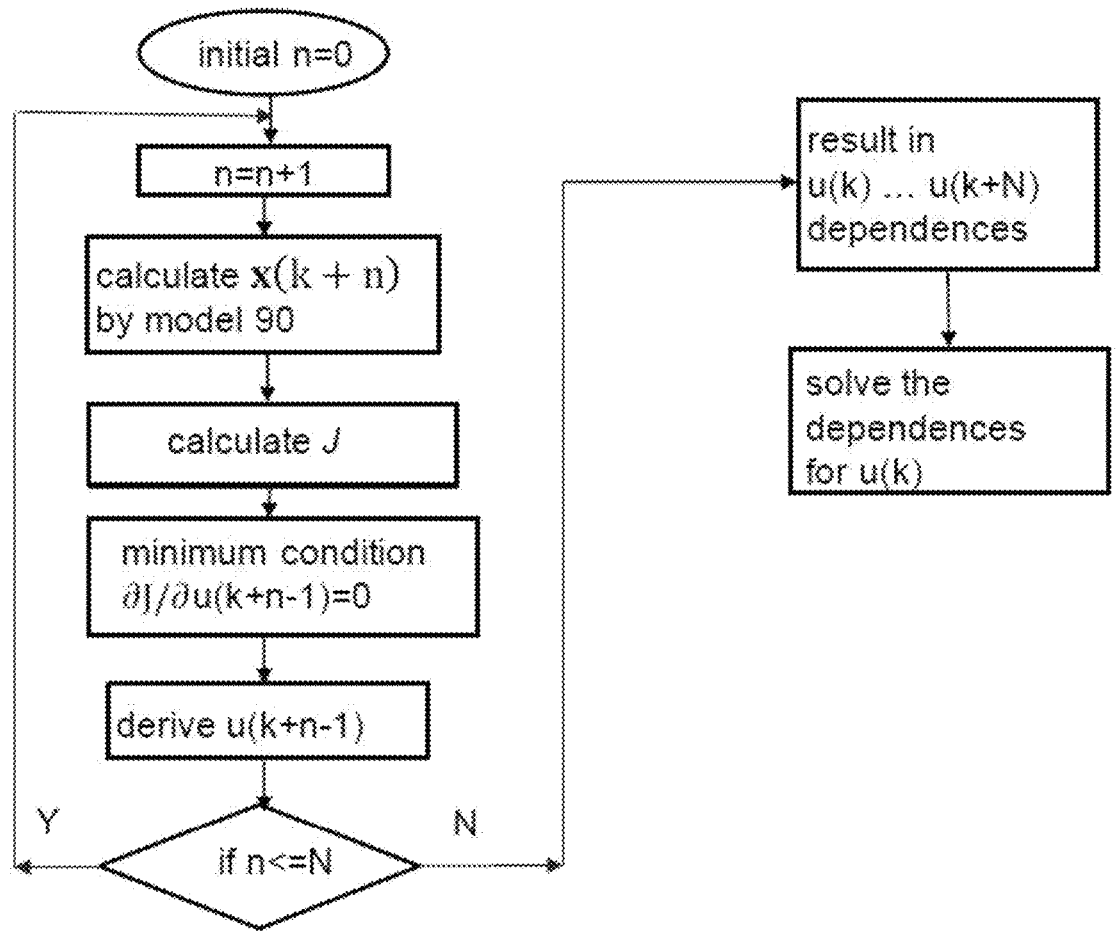
FIG. 4 is a flow diagram depicting an example of an algorithm to determine u.

The control input can be determined when the performance index reaches the minimum. The yaw dynamics model is used for the prediction of the future states. In this way the state x is controlled to approach the target $x_d$. An algorithm to determine u can be implemented as a flow diagram as shown in FIG. 4.

To summarize, a desired target, generated by a controls engineer or otherwise, represents a desired position of the autonomous vehicle 62 relative to the path 64. In particular, the present disclosure is directed to lateral control of the autonomous vehicle 62 relative to the path 64. The lateral controller 16 is tasked with controlling the autonomous vehicle 62 such that it follows the path 64. Thus, an output of the lateral controller 16 includes control signals for controlling actuators 24 of the autonomous vehicle 62. The control signals for controlling the actuators 24 may be calculated to control one or more of the front steer angle 26, rear steer angle 28 and wheel torque 30, 32.

The first controller 88 defines the target that the second controller 82 is required to achieve. That is, the output of the first controller 88 is a function of the actual and desired targets that are received as inputs to the first controller 88. Therefore, the second controller 82 receives calculations representing a difference between the actual and desired targets.

The second controller 82 receives calculated outputs of the first controller 88 and generates front and rear steering angles and braking force, input into a vehicle yaw dynamics module, shown at 90. This is fed back through the inner control loop 84. Meanwhile the sideslip and yaw rate are determined using a vehicle position model, illustrated at 92. This information will take yaw angle and lateral distance and coordinate with the desired target at the first controller 88.

The strategy of the present disclosure improves process performance by providing a more efficient design for a system and method of the present disclosure.

The invention claimed is:

1. A system for lateral control in-path tracking of an autonomous vehicle, including:
   a control system including a lateral controller, wherein the lateral controller is used to control movement of the autonomous vehicle relative to a path;
   an input to the lateral controller including a desired target of a relative yaw rate and a lateral distance;
   an outer control loop of the lateral controller including a first controller generating an output of the first controller using the desired target with the following equation:

$$\begin{bmatrix} \beta_d \\ \dot{\psi}_d \end{bmatrix} = -\begin{bmatrix} k_{out1} & k_{out2} \\ k_{out3} & k_{out4} \end{bmatrix} \begin{bmatrix} \psi_L \\ y_L \end{bmatrix} + u_0$$

with $$u_0(t) = \begin{bmatrix} \beta_{st} + \psi_{Ld} k_{out1} \\ \psi_{Ld} k_{out3} + \dot{\psi}_{st} \end{bmatrix}$$

an inner control loop of the lateral controller, including a second controller, receiving the output of the first controller;
   the inner control loop generating a sideslip angle and a yaw rate, wherein the sideslip angle and the yaw rate are returned to the second controller via the inner control loop, wherein the sideslip angle and the yaw rate are controlled using a controller defined as:

$$u = \begin{bmatrix} -k_{in1} & -k_{in2} \\ -k_{in3} & -k_{in4} \end{bmatrix} \begin{bmatrix} \beta - \beta_d \\ \dot{\psi} - \dot{\psi}_d \end{bmatrix} + u_0$$

with $$u_0(t) = B^{-1} \left( \begin{bmatrix} \dot{\beta}_d \\ \ddot{\psi}_d \end{bmatrix} - A \begin{bmatrix} \beta_d \\ \dot{\psi}_d \end{bmatrix} \right)$$

where
   $\beta$ sideslip angle
   $\beta_d$ desired sideslip angle $\beta_{st}$ steady sideslip angle
$\dot{\psi}$ yaw rate
$\dot{\psi}_d$ desired yaw rate
$\dot{\psi}_L$ relative yaw rate
$\dot{\psi}_{Ld}$ desired relative yaw rate
$\dot{\psi}_{st}$ steady yaw rate
k controller parameters
$y_L$ lateral distance
wherein the sideslip angle and the yaw rate are controlled to generate a relative yaw angle and the lateral distance;
wherein the relative yaw angle and the lateral distance are returned to the first controller, via the outer control loop, as the current position of the autonomous vehicle.

2. The system of claim 1, wherein the input to the lateral controller includes sensor signals or calculated signals.

3. The system of claim of claim 1, wherein the lateral controller controls the autonomous vehicle using at least one of front and rear steering angles, a wheel braking torque, and a wheel driving torque.

4. The system of claim 1, wherein an electronic control unit includes the lateral controller, wherein the electronic control unit receives sensor signals and the lateral controller is programmed to calculate an output to an actuator, which is at least one of front and rear steering angles, a wheel braking torque and a wheel driving torque.

5. The system of claim 1, wherein the second controller is designed based on the following yaw dynamics model:

$$\begin{bmatrix} \dot{\beta} \\ \ddot{\psi} \end{bmatrix} = \begin{bmatrix} -\dfrac{C_{af}+C_{ar}}{Mv} & -1-\dfrac{C_{af}l_f - C_{ar}l_r}{Mv^2} \\ -\dfrac{C_{af}l_f - C_{ar}l_r}{I_z} & -\dfrac{C_{af}l_f^2 + C_{ar}l_r^2}{I_z v} \end{bmatrix} \begin{bmatrix} \beta \\ \dot{\psi} \end{bmatrix} + Bu$$

with
$l_f$ distance from CG to the front axle
$l_r$ distance from CG to the rear axle
$C_{af}$ front tire stiffness
$C_{ar}$ rear tire stiffness
M vehicle total mass
$I_z$ moment of inertia of the vehicle about the z-axis at CG.

6. The system of claim 5, wherein the inner control loop takes calculated output from the first controller and generates front/rear steering, or frontsteering/wheel-torques, or front steering only, which are fed into the vehicle yaw dynamics to generate side slip and yaw rate.

7. The system of claim 1, wherein steering or wheel torque is used to determine at least one of front and rear steering angles, a braking torque, or a driving torque.

8. The system of claim 1, wherein the outer control loop uses the current position of the vehicle relative to the path and desired target to control actuators.

9. The system of claim 1, wherein a vehicle model for the outer loop dynamics includes:

$$\begin{bmatrix} \dot{\psi}_L \\ \dot{y}_L \end{bmatrix} = \begin{bmatrix} 0 & 0 \\ v & 0 \end{bmatrix} \begin{bmatrix} \psi_L \\ y_L \end{bmatrix} + \begin{bmatrix} 0 & 1 \\ v & l_s \end{bmatrix} \begin{bmatrix} \beta \\ \dot{\psi} \end{bmatrix} + \begin{bmatrix} -v \\ 0 \end{bmatrix} \dfrac{1}{R_T}.$$

10. A method for lateral control in-path tracking of an autonomous vehicle, including:
controlling movement of the autonomous vehicle relative to a path using a lateral controller;
inputting a desired target of a relative yaw rate and a lateral distance into the lateral controller;
generating a difference between the desired target and a current position of the autonomous vehicle using a first controller of an outer control loop of the lateral controller;
receiving the output of the first controller at a second controller of an inner control loop of the lateral controller;
controlling a sideslip angle and a yaw rate using the inner control loop, wherein the sideslip angle and the yaw rate are returned to the second controller via the inner control loop; and
generating a relative yaw angle and the lateral distance using the sideslip angle and the yaw rate, wherein the relative yaw angle and the lateral distance are returned to the first controller, via the outer control loop, as the current position of the autonomous vehicle.

11. The method of claim 10, further including inputting sensor signals or calculated signals into the lateral controller.

12. The method of claim 10, further including controlling the autonomous vehicle using at least one of front and rear steering angles, a wheel braking torque, and a wheel driving torque.

13. The method of claim 10, further including receiving sensor signals at the lateral controller and calculating an output to an actuator, which is a combination of front and rear steering angles, a wheel braking torque and a wheel driving torque.

14. The method of claim 10, further including receiving calculated output from the first controller at the inner control loop and generating front and rear steering angles and a braking force or a driving force, which are used to generate side slip and yaw rate.

* * * * *